United States Patent [19]

Scranton et al.

[11] 4,370,665

[45] Jan. 25, 1983

[54] PAPER TRANSPORT FOR A PRINTER TEST UNIT

[75] Inventors: Robert J. Scranton, Dayton; James R. Meckstroth, Centerville, both of Ohio

[73] Assignee: The Mead Corporation, Dayton, Ohio

[21] Appl. No.: 257,677

[22] Filed: Apr. 27, 1981

[51] Int. Cl.[3] .......... G01D 18/00

[52] U.S. Cl. .......... 346/75; 346/136; 346/146

[58] Field of Search .......... 346/75, 136, 146, 107 A, 346/140

[56] References Cited

U.S. PATENT DOCUMENTS

| | | | |
|---|---|---|---|
| 2,606,681 | 8/1952 | Ridenour | 216/28 |
| 3,188,080 | 6/1965 | Kelliher | 346/136 |
| 3,913,719 | 10/1975 | Frey | 346/75 |
| 4,122,457 | 10/1978 | Erikson et al. | 346/75 |
| 4,283,731 | 8/1981 | Bok et al. | 346/75 |

*Primary Examiner*—Stafford D. Schreyer

*Attorney, Agent, or Firm*—Biebel, French & Nauman

[57] ABSTRACT

A paper transport simulates movement of a plurality of documents past the print station of a ink jet printer. The transport includes an arrangement for transporting a continuous paper web past the print station and a tachometer drive roller for contacting the tachometer wheel of the printer system. The transport further includes a document simulator wheel aligned with the photo-optical document detector of the printer system such that the movement of a succession of documents past the print station may be simulated while the printer system prints upon the continuous paper web.

19 Claims, 5 Drawing Figures

PAPER TRANSPORT FOR A PRINTER TEST UNIT

BACKGROUND OF THE INVENTION

The present invention relates to a paper transport for transporting a paper web past the print station of a printer system and, more particularly, to such a transport for simulating movement of documents past the print station to permit testing and adjustment of a printer system. The paper transport is designed specifically for use with a printer system which senses the presence and the speed of movement of a succession of documents past the print station and which prints information, such as an address, on each of the documents.

Various types of prior art systems have been utilized for addressing preprinted documents, such as magazines, newspapers, catalogs, promotional material, and the like; and such systems have, in general, employed electrostatic printers or other printing devices for printing the addresses on a strip of labels. The printed labels were then applied to the magazines or newspapers by a suitable label application device. A typical prior art device for feeding preprinted documents and applying such labels thereto is disclosed in U.S. Pat. No. 2,606,681, issued Aug. 12, 1952, to Ridenour.

Other types of prior art addressing systems have printed addresses directly on the printed documents. Such a system, including a document feed arrangement, is disclosed in U.S. Pat. No. 4,122,457, issued Oct. 24, 1978, to Erikson et al. The Erikson system includes several ink jet printing nozzles which are oscillated back and forth across a moving document to print lines of characters on the document. Erikson discloses each nozzle printing at least one line of characters, and the suggestion is made that a single nozzle may be utilized to print more than one line. Since the Erikson et al device includes very few nozzles to accomplish printing, the device is limited in the speed at which it can address documents. Additionally, the Erikson et al printer system incorporates its own document transport and, therefore, is not readily compatible with document feed lines at existing printing facilities.

In order to provide an address printing system, capable of operating at high speeds and readily integratable into an existing document feeder system, a portable ink jet printing system, which does not require an electrical interface between the document feeder system and the printer, has been developed and is disclosed and claimed in U.S. patent application Ser. No. 142,787, filed Apr. 22, 1980, by Bok et al now U.S. Pat. No. 4,283,731, and assigned to the assignee of the present invention. The Bok et al device includes an ink jet print head which is supported by a printing arm movably mounted on a portable control console. The control console is adapted for placement adjacent a document feeder, which may be any one of a number of known feeder devices such as are typically incorporated in an existing printing facility. The printing arm is mounted on the control console in such a manner that it extends into a printing position over the feeder when the control console is placed adjacent thereto. The printing arm may be moved into a storage position which is clear of the document feeder when printing has been completed.

The Bok et al printer prints directly upon the face of documents transported past a print station, beneath the printing arm, and therefore eliminates the need for application of address labels. Thus, compatibility with existing addressing systems is achieved by merely removing the label applicator which previously was utilized with the document feed system. The print arm may thus occupy the space which previously had been occupied by the label applicator.

In order to provide compatibility with a broad range of existing document feeders, without the need for electrical interface circuitry connecting the printer system with the feeders, the Bok et al system includes a document sensor which is mounted on the printing arm and which senses the movement of a document past the print station. This sensor is of the photo-optical type which directs a light beam downward into the path of the documents. The light beam is thereafter reflected upward to the sensor, either by a document moving past the print station or by the document support platen of the feeder. Typically, the feeder support platen is highly reflective and, therefore, a greater amount of light is reflected to the sensor by the platen than by the documents, which are of lower reflectivity. The sensor thus provides a means for detecting the movement of the leading edge of each document past the print station beneath the printer so that the printed address may be positioned appropriately with respect to this leading edge.

It will be appreciated that the speed of movement of the documents past the print station may vary somewhat during operation of a document feeder and, further, that the speed of movement of documents will vary somewhat more widely between different types of feeder devices. In order to synchronize the deposit of drops on the document surfaces with the movement of the documents past the print station in order that the drops may be deposited in a precisely controlled manner to form the desired characters of the address, the Bok et al printer system includes a tachometer wheel, mounted on the print arm, which is connected to a tachometer. The tachometer wheel contacts each of the documents moving past the print station. The tachometer provides a tachometer pulse train, the frequency of which is proportional to the speed of document movement.

The Bok et al printer system is designed specifically for sensing the presence and speed of movement of a succession of documents transported past a print station, and for printing an address or other information on each of the documents. When it is necessary to service or adjust the Bok et al printer system, it is desirable to observe the printer as it prints upon a continuous web of paper, which may thereafter be disposed at little expense. However, such a web would not provide the fluctuations in reflectivity which the document sensor of the Bok et al printer system utilizes to determine the proper location for printing addresses on each of the documents. Thus, it is seen that there is a need for a printer test unit which simulates the movement of a plurality of documents past the print station as it transports a paper web beneath the printing arm for printing thereon.

Additionally, since print image quality produced by the Bok et al printer system is dependent, in part, upon the document feeder system, it is desirable to provide a paper transport which may be used in conjunction with the Bok et al printer system to assess print image quality. Further, a paper transport which simulates the movement of documents past the print station permits proofing of address information which is to be printed by the Bok et al printer system on a number of documents.

SUMMARY OF THE INVENTION

A paper transport for simulating movement of a plurality of documents past the print station of an ink jet printer system is provided for use with a printer system of the type including a photo-optical document detector, mounted adjacent the print station, which directs a beam of light toward the documents at the print station. The detector senses changes in the amount of light reflected thereto as documents pass the print station. The ink jet printer system further includes a tachometer wheel, rotatably mounted at the print station and connected to a tachometer, for providing an indication of the speed of the documents moving past the print station.

The paper transport may be utilized as a printer test unit and includes a test unit cabinet, having a paper supporting platen for supporting a web of paper at the print station, a web supply means, mounted on the cabinet, for providing a paper web for transport across the platen, and a web receiving means, mounted on the cabinet, for receiving the paper web after the web is transported across the platen. A web drive roller means engages the web of paper and transports the web from the web supply means across the platen to the web receiving means. A motor means is connected to the web drive roller means for rotating the web drive roller means. A document simulator means, adjacent to the web at the print station, cyclically alters the amount of light reflected to the photo-optical document detector. A tachometer drive means is connected to the motor means for rotating the tachometer wheel in synchronization with movement of the paper web.

The document simulator means may comprise a rotatable simulator wheel, aligned to reflect the beam of light and coupled to the tachometer drive means. The rotatable simulator wheel defines at least one area of relatively high reflectivity and at least one area of relatively low reflectivity for cyclically altering the amount of light reflected to the photo-optical document detector in synchronization with movement of the paper web.

The tachometer drive means may comprise a tachometer drive roller, rotatably mounted for contact with the tachometer wheel. The rotatable simulator wheel defines areas of relatively high and low reflectivity on its periphery. The motor means may include a variable speed motor and a drive linkage means which interconnects the variable speed motor, the tachometer drive roller, and the web drive roller means.

The paper transport may further include paper sensor means, mounted adjacent the print station, for terminating operation of the motor means when substantially all of the paper web has been transported from the web supply means to the web receiving means. The transport unit may also include an ink catch pan, mounted on the test unit cabinet, for receiving ink drops from the ink jet printer.

Accordingly, it is an object of the present invention to provide a paper transport for use with a printer system of the type arranged to print documents as the documents are successively transported past a print station, said system including a document detector for detecting movement of successive documents past the print station, in which the paper transport includes a document simulator for simulating to the document detector the movement of documents past the print station as printing is effected on a paper web; to provide such a transport in which the document simulator includes an arrangement for simulating the movement of documents past the print station to a photo-optical document detector in the printer system; to provide such a transport in which the arrangement for simulating includes a rotatable simulator wheel having areas of differing reflectivity; to provide such a paper transport which further includes a tachometer drive for rotating a tachometer wheel in the printer system in synchronization with movement of the paper web at the print station; and to provide such a paper transport including a platen for supporting the paper web at the print station, and further including an ink catch pan for receiving drops from an ink jet printer incorporated within the printer system.

Other objects and advantages of the invention will be apparent from the following description, the accompanying drawings and the appended claims.

DESCRIPTION OF THE PREFERRED EMBODIMENT

Figure 1:
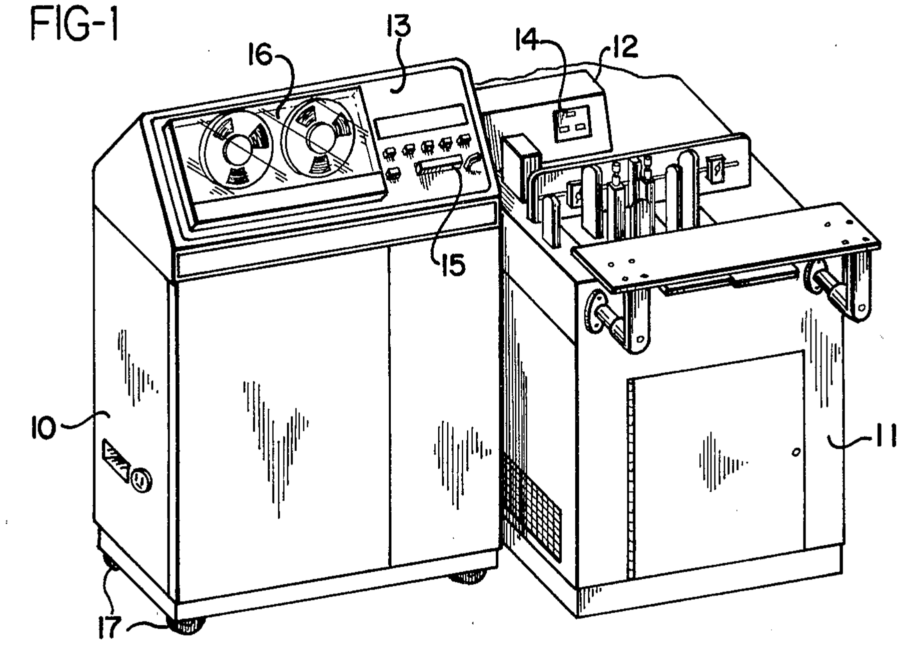
FIG. 1 is a perspective view showing an ink jet printer addressing system operating in conjunction with a prior art document feeding device.
Figure 2:
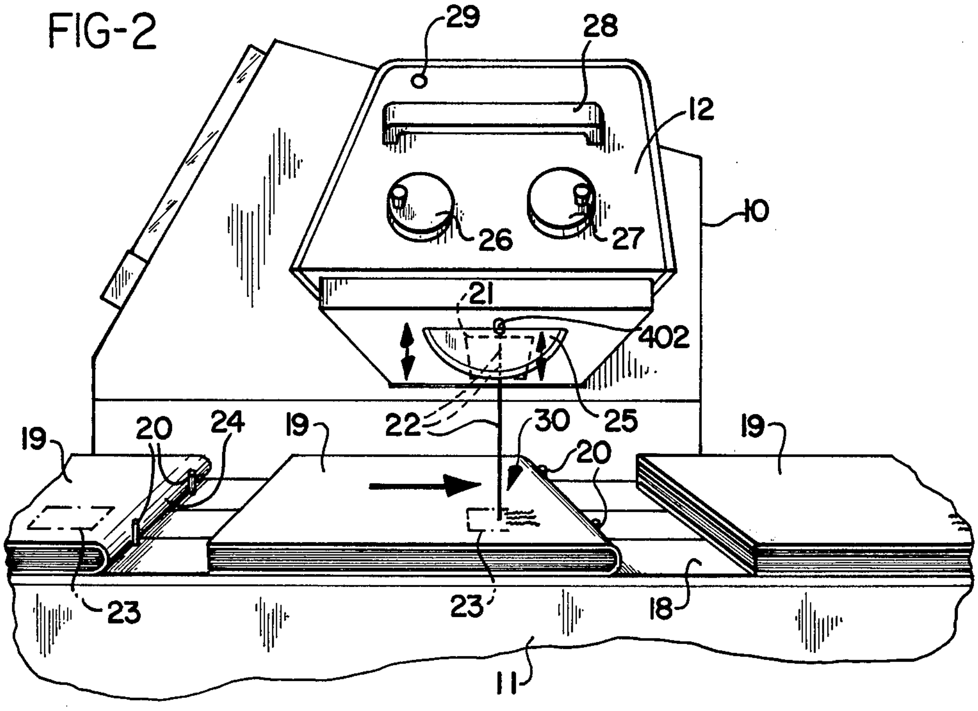
FIG. 2 is a perspective view of the addressing system and feeding device, as seen looking generally right to left in FIG. 1, illustrating the manner in which printing is effectuated on successive documents.

A document addressing system of the type arranged to print addresses on documents as the documents are transported in succession past a print station, is illustrated in FIGS. 1 and 2. A portable ink jet printing console 10 is positioned alongside a prior art document feeder 11. Console 10 is supported by a set of wheels 17 for ready portability and has an extendable printing arm 12 which is positioned above feeder 11. Document feeder 11 may be any one of a number of commercially available devices such as, for instance, a device known in the trade as a Cheshire Model 524. The document addressing system, including console 10 and printing arm 12 is of the type disclosed in copending U.S. patent application Ser. No. 142,787, filed Apr. 22, 1980, by Bok et al, now U.S. Pat. No. 4,283,731 and assigned to the assignee of the present invention.

Document feeder 11 includes means for removing individual documents from a stack, and means for feeding the documents in succession under printing arm 12. An ink jet print head, as more fully described in the above referenced Bok et al application, is carried by print arm 12 for addressing documents during movement of the documents past a print station beneath arm 12. Since document feeder 11 forms no part of the present invention and is well known in the trade, descriptive details thereof are not included herein. For a general description of the operation of such document unstacking, feeding, and stacking mechanisms, reference may be had to U.S. Pat. No. 2,606,681, issued Aug. 12, 1952, to Ridenour. As described in the Ridenour patent, a label applicator is provided for applying previously printed address labels to magazines transported beneath the applicator. The Bok et al printer system eliminates the necessity of such a label applicator, since it prints addresses directly upon the documents. The Bok et al printer system is typically substituted for the label applicator in an existing document addressing line, as more fully described in the above referenced Bok et al application, after the applicator has been removed to make room for printing arm 12.

A supervisor control panel 13 is mounted on the front of console 10. Control panel 13 includes a series of switches for enabling supervisory personnel to make all of the necessary settings and adjustments for a particular addressing job. The controls on control panel 13 ordinarily are not operated by production personnel. An operator control panel 14 is mounted on print arm 12 for such use. The controls on control panel 14 are relatively simple on/off print head operating controls. Control panel 14 preferably also includes an error light for indicating system conditions requiring intervention by supervisory personnel or skilled non-production personnel.

Data codes corresponding to the mailing addresses to be printed on the documents are carried by a magnetic tape, which is mounted on a tape drive unit 16 within console 10. An opening within supervisor-controlled panel 13 is provided into which may be inserted a font cartridge 15. A series of font codes representing dot matrix characters to be printed by the ink jet printer are carried by a read only memory, which is installed within font cartridge 15. A data processing subsystem reads the magnetic tape and accesses the read only memory to control the ink jet print head, as described more fully in the Bok et al application.

The manner in which the documents are printed may be understood by reference to FIG. 2, wherein a conveyor 18 is shown transporting a series of documents 19 under printing arm 12. Documents 19 are positioned against timing lugs 20, which provide relatively uniform spacing between successive documents. Timing lugs 20, however, do not control the operation of the ink jet printer in any way. Mounted within printing arm 12 is an ink jet print head, which is illustrated generally at 21, and which generates a series of jet drop streams 22. Drops in the streams 22 are directed downward for printing on documents 19 as the documents move past a print station, indicated generally at 30.

Print head 21 may be constructed as generally described in U.S. Pat. No. 3,701,998, issued Oct. 31, 1972, to Mathis. A jet printer of this type generates two parallel rows of closely spaced jet drop streams. A stimulation device causes the jets to break up into streams of uniformly sized and regularly spaced drops. A series of charge rings (not shown) produce electrical charging of selected ones of the drops, as may be required for printing the desired addresses. Those drops which are charged are deflected by appropriate deflection fields into drop catchers (not shown). The drops which are uncharged, however, fall downward toward documents 19 and collectively form the characters of the addresses within address areas 23.

For illustration purposes, FIG. 2 shows a large vertical separation between print arm 12 and documents 19. In reality, this distance is only about 2 inches. A vertical positioning means, including a control knob 27, is provided for lowering print head 21 relative to printing arm 12, so as to achieve a printing distance of about 0.25 inches.

In order to maintain registration of the printing of addresses by the ink jet print head within the address areas 23 of documents 19, printing arm 12 carries a photo-optical document detector 402. Detector 402 is a conventional two-way photoelectric sensor which directs a beam of light downward across the path of the documents 19 at the print station 30 and detects changes in the amount of light reflected to the detector 402. Detector 402 thus senses the leading edge 24 of a document 19 and provides a control signal which enables the data processing subsystem to initiate printing at the proper time for appropriate positioning of the addresses within areas 23. Typically, the portion of the conveyor 18 toward which the beam of light is directed is formed of metal and has a much higher reflectivity than the surfaces of the documents 19. Thus detector 402 receives substantially less light when a document 19 is positioned at the print station 30 than is the case when a document is not positioned at the print station. It will be appreciated that the ink jet addressing system could also operate with a document feeder having a conveyor 18 which has a reflectivity less than that provided by the document surfaces.

In order to provide printing by print head 21 in synchronism with the movement of each of the documents 19 past the print station 30, printing arm 12 carries a tachometer wheel 25. Tachometer wheel 25 is rotatably mounted at the print station 30 and is connected to a tachometer (not shown), such as a conventional shaft encoder, for providing tachometer pulses in synchronism with document movement. The frequency of the tachometer pulse train is proportional to the speed of the document moving past the print station. The tachometer pulse train enables the data processing subsystem to exercise proper timing control over the operation of the ink jet printer. For a better understanding of matters relating to such timing control, reference may be had to U.S. Pat. No. 3,588,906, issued June 28, 1971, to Van Brimer et al; U.S. Pat. No. 3,803,628, issued Apr. 9, 1974, to Van Brimer et al; and U.S. Pat. No. 3,913,719, issued Oct. 21, 1975, to Frey. Tachometer wheel 25 is vertically adjustable for contact with the upper surfaces of documents 19. For this purpose, there is provided a manually operatable control knob 26 on printing arm 12.

FIGS. 1 and 2 illustrate printing arm 12 extended in a typical operating position. When not in use, however, printing arm 12 may be moved inwardly into a retracted position within cabinet 10. Printing arm 12 may also be extended from cabinet 10 further than is shown in FIGS. 1 and 2. Thus, arm 12 can be appropriately positioned above document feeders of various sizes. Additionally, extension of arm 12 beyond the position shown in FIGS. 1 and 2 permits the print head 21 to be positioned above a drop catch pan incorporated in the printer test unit of the present invention, as described more fully below. A handle 28 is provided for moving the print head 12 from its storage position within cabinet 10 to a desired printing position. A release button 29 releases a "fail safe" braking arrangement, described in the Bok et al application, to enable movement of the print arm 12 to any desired position over conveyor 18. The braking arrangement is normally engaged and is only released momentarily by activation of button 29.

It will be appreciated that the Bok et al ink jet addressing system is advantageous in that timing and printing control are effectuated without the need for electrical interface circuitry between the addressing system and the document feeder 11. Independent operation of the addressing system is made possible by the use of the photo-optical document detector 402 and the tachometer wheel 25 which detect the movement of the leading edge 24 of the document through the print station 30 and the speed of the document, respectively. This ink jet addressing system, however, is specifically designed for addressing a plurality of separate documents as they are sequentially transported past the print station 30. It will be appreciated that it may be necessary from time to time to service or otherwise adjust the Bok et al ink jet printer addressing system and to observe printing by this system. Such observations could be made simply by feeding a succession of documents 19 past the print station 30 by means of the document feeder 11 with which the addressing system normally operates. It will be appreciated, however, that this may be undesirable in that a substantial number of documents 19 would be printed during servicing and might thereafter have to be discarded. Additionally, there is a need for a paper transport which permits servicing the printer system while a spare printer system is used with the document feeder for addressing documents. Also, it is desirable to be able to proof the data codes carried by a magnetic tape prior to actual addressing of the documents.

The paper transport of the present invention provides an arrangement by which the ink jet printer system may print upon a moving paper web while the test unit simulates to the ink jet addressing system the movement of a succession of documents past the print station 30.

Figure 3:
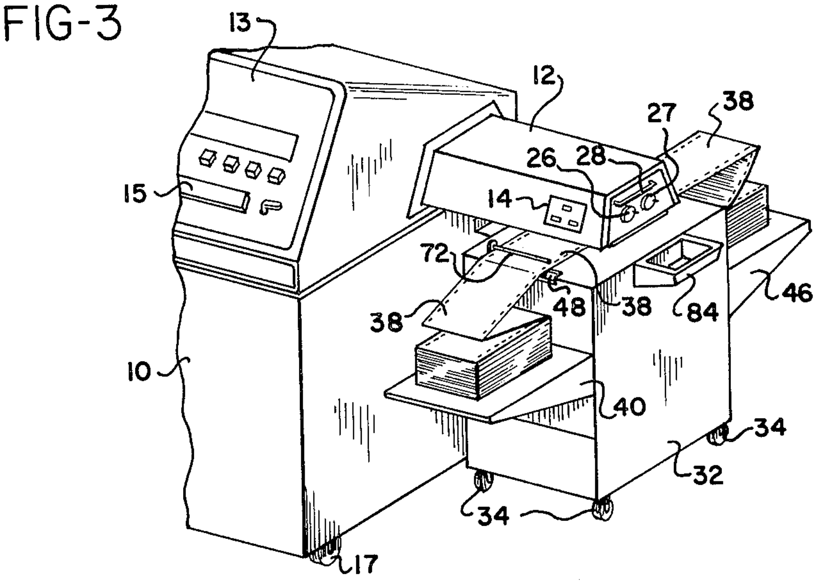
FIG. 3 is a perspective view illustrating the paper transport of the present invention positioned adjacent an ink jet printer addressing system.
Figure 4:
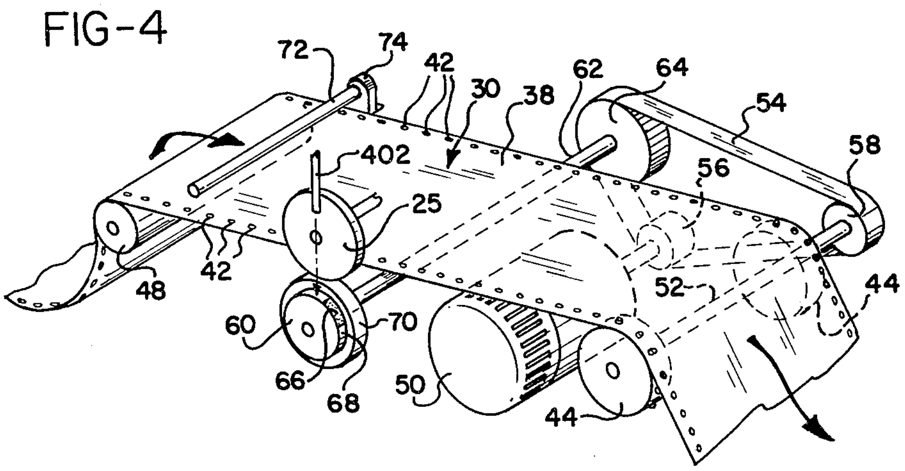
FIG. 4 is a diagrammatic representation of the paper transport, illustrating the manner in which a web of paper is transported past the print station and documents are simulated.
Figure 5:
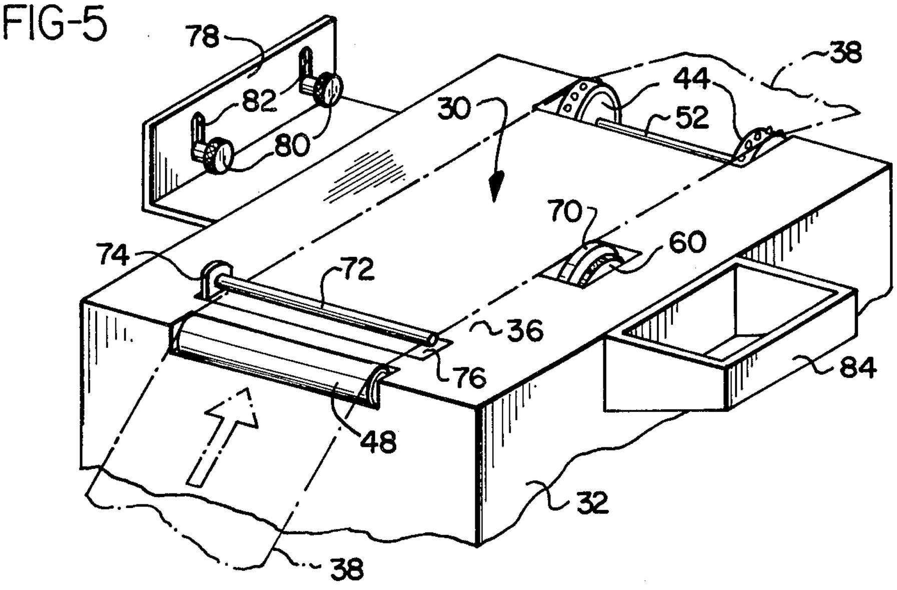
FIG. 5 is a perspective view of the upper portion of the paper transport.

Reference is now made to FIGS. 3–5, which illustrate the printer test unit of the present invention. The test unit includes a test cabinet 32 which is mounted on wheels 34, permitting it to be moved easily into position beneath the arm 12 of the addressing system. The test unit cabinet includes a paper supporting platen 36 which supports a paper web 38 at the print station. Shelf 40, mounted on the cabinet 32, acts as a web supply means for providing a supply of paper for transport across the platen.

As illustrated in FIG. 3, paper web 38 is folded in a fan-fold configuration, thus eliminating the need for a supply roll support. Paper web 38 includes a plurality of sprocket holes 42 spaced along each edge which are engaged by a web drive roller means, including sprocket wheels 44, for transporting the paper web past the print station 30. Shelf 46, mounted on cabinet 32, provides a web receiving means for receiving the paper web 38 after the web is transported across platen 36. Idler roller 48, mounted on cabinet 32 for free rotation, reduces the sliding friction between the web 38 and the web supporting platen 36.

A motor means, including variable speed motor 50, is connected by a drive linkage means to the shaft 52 on which sprocket rollers 44 are mounted for rotating the sprocket rollers 44. The drive linkage means includes timing belt 54 which engages timing pulley 56, mounted on the motor shaft of motor 50. Belt 54 further engages timing pulley 58, mounted on shaft 52.

A document simulator means, comprising rotatable simulator wheel 60 mounted on shaft 62, is positioned adjacent the web 38 at the print station 30 for cyclically altering the amount of light reflected to the photo-optical document detector 402. Timing belt pulley 64, engaging timing belt 54, is mounted on shaft 62 such that the simulator wheel 60 is rotated by the drive linkage means as the web 38 is moved past the print station 30. Simulator wheel 60 is aligned to reflect the beam of light from detector 402, and defines at least one area 66 of relatively high reflectivity and at least one area 68 of relatively low reflectivity, both of which are positioned on the periphery of wheel 60. Thus, as wheel 60 is rotated, the amount of light reflected to the detector 402 is cyclically altered in synchronization with movement of the paper web 38.

The test unit further includes a tachometer drive means, comprising tachometer drive roller 70 mounted on shaft 62, for rotating the tachometer wheel 25 in synchronization with movement of the paper web 38. When the test unit is properly positioned, the tachometer wheel 25 contacts the tachometer drive roller 70.

The test unit also includes a paper sensor, including sensor bar 72, extending horizontally from arm 74 and contacting the upper surface of paper web 38. Sensor bar 72 and arm 74 are spring biased downward such that the bar drops into slot 76 in platen 36 when substantially all of the paper web 38 has been printed and the web is no longer present beneath the bar 72. A switch (not shown), attached to arm 74, is connected electrically in series with motor 50. Thus, when the paper web supply from shelf 40 has been exhausted, the motor 50 is switched off and operation of the test unit is terminated.

The present invention provides an arrangement by which transport of successive documents past the print station is simulated, while the printing system prints on the continuous paper web 38. The tachometer wheel 25 in one embodiment of the printer system is approximately 8.3334 inches in circumference and is drivingly connected to the tachometer such that it provides 1200 tachometer pulses during each 10 inches of movement of a document past the print station. The tachometer drive roller 70 preferably has a circumference of 10 inches. The reflective area 66 on simulator wheel 60 extends through 30° of the circumference of the wheel 60 and, therefore, sensor 402 senses a spacing between successive simulated documents of 100 tachometer pulses or 0.8333 inches. Therefore, a document of 9.1667 inches (1100 tachometer pulses) is simulated during each rotation of the tachometer drive roller 70.

If desired, a second area of high reflectivity may be provided on the opposite side of simulator wheel 60 such that the movement of two documents past the print station 30 is simulated during each rotation of wheel 60. In such an instance, each of the simulated documents is 4.1667 inches (500 tachometer pulses) in length, with each of the simulated interdocument spacings being approximately 0.8333 inches (100 tachometer pulses). It will be appreciated that when using a wheel 60 having a pair of reflective surfaces 66, one of the surfaces 66 may be masked by placing a piece of tape over the surface, if it is desired to simulate printing of longer documents.

The ratio in diameters of pulleys 56, 58, 64, and drive sprockets 44 are such that the speed of movement of the paper web 38 past the print station 30 corresponds to the tangential velocity imparted to the tachometer wheel 25. The maximum web speed obtainable with the printer test unit of the present invention is approximately 250 feet per minute.

In order to facilitate alignment of the test unit with the print arm 12, bracket 78 (FIG. 5) is mounted on the side of cabinet 32 closest to the ink jet addressing system. A pair of threaded bolts 80 extend through slots 82 and are received within threaded holes in the side of cabinet 10.

It may be desirable for a technician to observe operation of the ink jet print head without actually printing on the web 38. For this purpose, an ink catch pan 84 is mounted on the test unit cabinet 32 for receiving drops of ink from the print head. In order to use the catch pan 84, the print arm 12 is extended outwardly by actuating the release button 29 such that the print head 21 is positioned above the pan 84. A fluid reservoir may be provided within the cabinet 32 for receiving the ink collected within the catch pan 84.

While the form of apparatus herein described constitutes a preferred embodiment of the invention, it is to be understood that the invention is not limited to this precise form of apparatus, and that changes may be made therein without departing from the scope of the invention.

What is claimed is:

1. A paper transport for use with a printer system of the type arranged to print documents as said documents are successively transported past a print station, said system including a photo-optical document detector for detecting movement of successive documents past said print station by directing a beam of light across the path of said documents at said print station and detecting changes in the amount of light reflected to said photo-optical document detector, comprising:

means for transporting a paper web past said print station for printing on said web, and document simulator means, positioned at said print station, for cyclically altering the amount of light reflected to said photo-optical document detector, whereby movement of documents past said print station is simulated and printing may be effected on said paper web in response to changes in the amount of light reflected from said document simulator means.

2. The paper transport of claim 1 in which said document simulator means includes means for cyclically altering the amount of light reflected to said photo-optical document detector in synchronization with movement of said paper web past said print station.

3. The paper transport of claim 1 in which said document simulator means comprises a rotatable simulator wheel mounted at said print station and defining on its surface at least one area of relatively high reflectivity and at least one area of relatively low reflectivity.

4. The paper transport of claim 3 for use with a printer system of the type which further includes a tachometer wheel, mounted at said print station, for contact with and rotation by documents moving past the print station, and a tachometer, connected to said tachometer wheel, for providing a tachometer pulse train indicative of the speed of movement of said documents, said paper transport further comprising a tachometer drive roller, connected to and axially aligned with said rotatable simulator wheel, for rotating said tachometer wheel in synchronization with rotation of said rotatable simulator wheel.

5. The paper transport of claim 3 in which said rotatable simulator wheel defines said areas of relatively high and low reflectivity on its periphery.

6. The paper transport of claim 3 in which said means for transporting a paper web comprises web drive roller means, engaging said web, and motor means, connected to said drive roller means, for rotating said web drive roller means to move said paper web past said print station.

7. The paper transport of claim 6 in which said rotatable simulator wheel is connected to said motor means for rotation of said simulator wheel in synchronism with rotation of said web drive roller means.

8. The paper transport of claim 6 in which said motor means comprises a variable speed motor, and drive linkage means interconnecting said variable speed motor and said web drive roller means.

9. The paper transport of claim 6 further comprising paper sensor means, mounted adjacent said print station, for preventing operation of said motor means when said paper web is not present at said print station.

10. The paper transport of claim 1 for use with a printer system of the type which further includes a tachometer wheel, mounted at said print station, for contact with and rotation by documents moving past the print station, and a tachometer, connected to said tachometer wheel, for providing a tachometer pulse train indicative of the speed of movement of said documents, said paper transport further comprising:

tachometer drive means, connected to said means for transporting a paper web past said print station, for rotating said tachometer wheel in synchronization with movement of said paper web past said print station.

11. The paper transport of claim 10 in which said tachometer drive means comprises a tachometer drive roller rotatably mounted for contact with said tachometer wheel.

12. The paper transport of claim 1 for use with a printer system of the type incorporating an ink jet printer for printing on said documents, further comprising a transport housing defining a paper supporting platen for supporting said paper web at said print station, and an ink catch pan, mounted on said housing, for receiving ink drops from said ink jet printer.

13. A printer test unit for simulating movement of a plurality of documents past the print station of an ink jet printer system, said printer system including a photo-optical document detector mounted adjacent said print station which directs a beam of light toward said documents at said print station and which senses changes in the amount of light reflected thereto as said documents pass said print station, said ink jet printer system further including a tachometer wheel, rotatably mounted at said print station and connected to a tachometer, for providing an indication of the speed of said documents moving past said print station, comprising:

a test unit cabinet including a paper supporting platen for supporting a paper web at said print station, web supply means mounted on said cabinet, for providing a paper web for transport across said platen, web receiving means, mounted on said cabinet, for receiving said paper web after said web is transported across said platen, web drive roller means, for engaging said web of paper and transporting said web from said web supply means across said platen to said web receiving means, motor means, connected to said web drive roller means, for rotating said web drive roller means, document simulator means, positioned adjacent said web at said print station, for cyclically altering the amount of light reflected to said photo-optical document detector whereby movement of documents past said print station is simulated and printing may be effected on said paper web in response to changes in the amount of light reflected from said document simulator means, and tachometer drive means, connected to said motor means, for rotating said tachometer wheel in synchronization with movement of said paper web.

14. The printer test unit of claim 13 in which said document simulator means comprises a rotatable simulator wheel, aligned to reflect said beam of light and coupled to said tachometer drive means, and defining at least one area of relatively high reflectivity and at least one area of relatively low reflectivity for cyclically altering the amount of light reflected to said photo-optical document detector in synchronization with movement of said paper web.

15. The printer test unit of claim 14 in which said tachometer drive means comprises a tachometer drive roller rotatably mounted for contact with said tachometer wheel.

16. The printer test unit of claim 15 in which said rotatable simulator wheel defines said areas of relatively high and low reflectivity on its periphery.

17. The printer test unit of claim 16 in which said motor means comprises a variable speed motor, and drive linkage means interconnecting said variable speed motor, said tachometer drive roller, and said web drive roller means.

18. The printer test unit of claim 13 further comprising paper sensor means, mounted adjacent said print station, for terminating operation of said motor means when substantially all of said paper web has been transported from said web supply means to said web receiving means.

19. The printer test unit of claim 13, further comprising an ink catch pan mounted on said test unit cabinet, for receiving ink drops from said ink jet printer.

* * * * *